United States Patent [19]
Cho

[11] Patent Number: 5,671,930
[45] Date of Patent: Sep. 30, 1997

[54] SEAL STRUCTURE FOR CYLINDER HEADS

[75] Inventor: Kwang Hyon Cho, Kunpo, Rep. of Korea

[73] Assignee: Kia Motors Corporation, Seoul, Rep. of Korea

[21] Appl. No.: 684,846

[22] Filed: Jul. 25, 1996

[30] Foreign Application Priority Data

Jul. 8, 1996 [KR] Rep. of Korea ............... 1996-20185

[51] Int. Cl.[6] ............................................. F16J 15/08
[52] U.S. Cl. ............... 277/235 B; 277/180; 277/167.5; 277/168; 123/193.3; 123/193.5
[58] Field of Search ............................. 277/235 B, 180, 277/167.5, 168

[56] References Cited

U.S. PATENT DOCUMENTS

| | | | |
|---|---|---|---|
| 5,221,097 | 6/1993 | Ishikawa et al. | 277/235 B |
| 5,275,139 | 1/1994 | Rosenquist | 277/235 B |
| 5,343,837 | 9/1994 | Ward et al. | 277/235 B |
| 5,544,899 | 8/1996 | Ueta | 277/235 B |

*Primary Examiner*—William A. Cuchlinski, Jr.
*Assistant Examiner*—Christina Annick

[57] ABSTRACT

A sealing structure for cylinder heads is disclosed. The sealing structure has a bead placing means which is provided in the junction between the cylinder head and block. The bead of a gasket is placed in the bead placing means, so that the ridge of the bead is not excessively compressed but is brought into linear contact with the bead placing means. The bead thus maintains its elasticity for a lengthy period of time, thereby sealing the junction irrespective of highly-pressurized combustion gases and preventing leakage of coolant and engine oil through the junction. The sealing structure also reduces the amount of mixed gas filling in the junction, thus improving the mileage of a vehicle. The sealing structure almost completely restricts the exhaust of unburnt mixed gases during an exhaust stroke of an engine, thus allowing the engine to be less likely to cause environmental pollution.

4 Claims, 2 Drawing Sheets

5,671,930

SEAL STRUCTURE FOR CYLINDER HEADS

BACKGROUND OF THE INVENTION

1. Field of the Invention

The present invention relates, in general, to a sealing structure for cylinder heads of internal combustion engines and, more particularly, to a structural improvement in such a sealing structure for reducing the number of gaskets, placed in the junction between the cylinder head and cylinder block, and thereby almost completely restricting the exhaust of unburnt mixed gas during an exhaust stroke of an engine.

2. Description of the Prior Art

A known sealing structure for cylinder heads of internal combustion engines is shown in FIG. 1. As shown in the drawing, the typical sealing structure comprises a plurality of, for example, three gaskets 30 which are placed in the junction between the cylinder head 10 and the cylinder block 20. Each gasket 30 has an opening at a position corresponding to the combustion chamber of the cylinder block 20. Of the above gaskets 30, the uppermost and lowermost gaskets 30 have respective beads 31 on their inside edges.

In the above sealing structure, the gaskets 30 are used for not only sealing the junction between the head 10 and block 20 irrespective of the highly-pressurized combustion gases but also for preventing leakage of coolant and engine oil through the junction.

However, the above sealing structure has the following problems. That is, the gaskets 30 are highly compressed between the head 10 and block 20, so that the beads 31 of the gaskets 30 lose their elasticity and thereby fail to completely seal the junction between the head 10 and block 20. In this regard, the highly-pressurized combustion gases leak through the junction thus causing the engine to be damaged or break down. In the above sealing structure, three gaskets 30 are overlapped with gaps, which are formed by the beads 31. A part of the mixed gas, which has been sucked into the cylinder during a suction stroke of the engine fills the gaps between the gaskets 30. The mixed gas in the gaps is not burnt during an explosion stroke of the engine, but is regrettably exhausted to the atmosphere during an exhaust stroke of the engine, thus reducing the mileage of a vehicle. The unburnt mixed gas exhausted into the atmosphere also increases the amount of carbon dioxide in air thereby causing environmental pollution.

SUMMARY OF THE INVENTION

It is, therefore, an object of the present invention to provide a sealing structure for cylinder heads of internal combustion engines by which the above problems can be overcome and which is provided with a bead placing means in the junction between the cylinder head and block.

When a gasket is placed in the junction between the cylinder head and block, the ridge of the bead of the gasket is not excessively compressed, but is brought into linear contact with the bead placing means. The bead thus maintains its elasticity for a lengthy period of time. In this regard the sealing structure of this invention reliably seals the junction between the head and block irrespective of highly-pressurized combustion gases and prevents leakage of coolant and engine oil through the junction. The above sealing structure also reduces the amount of mixed gas filling in the junction between the head and block, thus improving the mileage of a vehicle. The sealing structure almost completely restricts the exhaust of unburnt mixed gases during an exhaust stroke of an engine, thereby allowing the engine to be less likely to cause environmental pollution due to exhaust of the unburnt mixed gases.

In the present invention, the bead placing means may be provided on the cylinder head by cutting off the inside edge of the bottom surface of the head. In this case, one gasket (first gasket) with a bead is placed in the junction between the head and block. Alternatively, the bead placing means may be provided on both the cylinder block and cylinder head by cutting off the inside edges of the top and bottom surfaces of the block and head. In this case, an additional gasket having the same construction as the first gasket is closely overlapped under the first gasket while being turned upside down thus forming a closed cavity by the beads of the gaskets. As a further alternative, the bead placing means may be provided on the cylinder head by depressing the bottom surface of the head at a position near the inside edge of the head.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
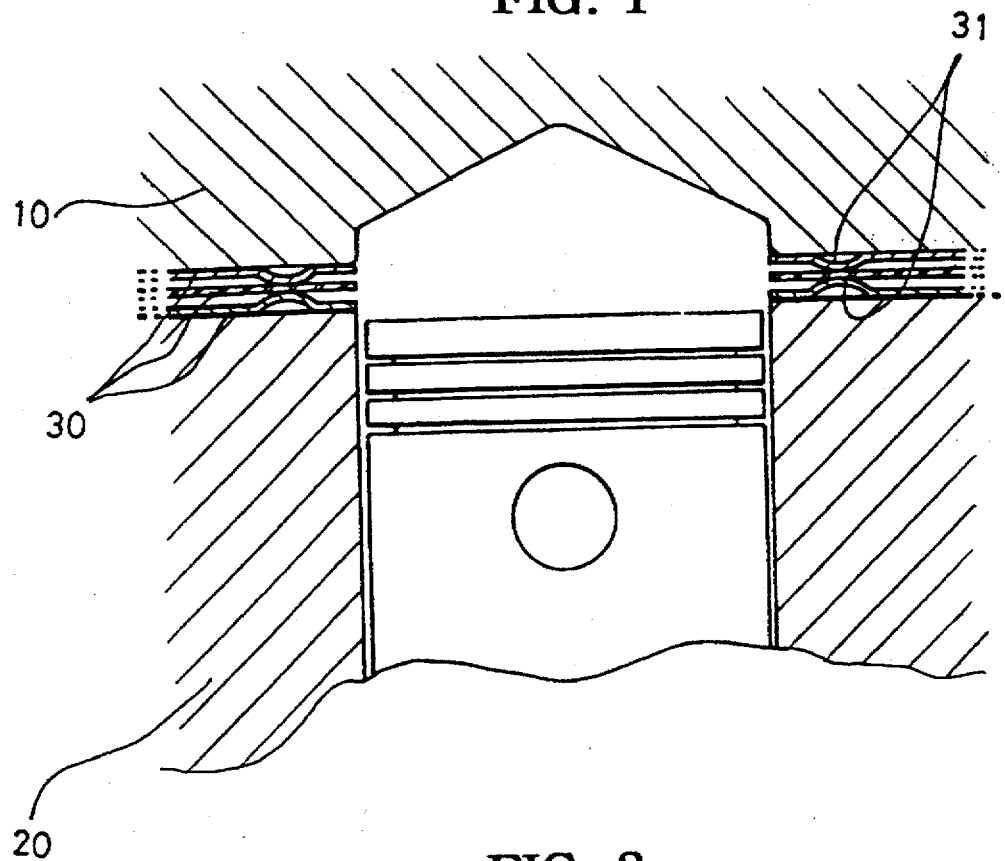
FIG. 1 is a sectional view showing a typical sealing structure for cylinder heads of internal combustion engines.

In the present invention, the general shape of the sealing structure for internal combustion engines remains the same as in the typical structure of FIG. 1, but the number of gaskets is reduced and the construction of the cylinder head and/or the block is altered to form a bead placing means in the junction between the head and block. Most of the elements of the sealing structure according to this invention will thus carry the same reference numerals as those of the typical structure of FIG. 1.

In the present invention, the bead of a gasket is placed in the bead placing means, so that the ridge of the bead is not excessively compressed but is brought into linear contact with the bead placing means.

Figure 2:
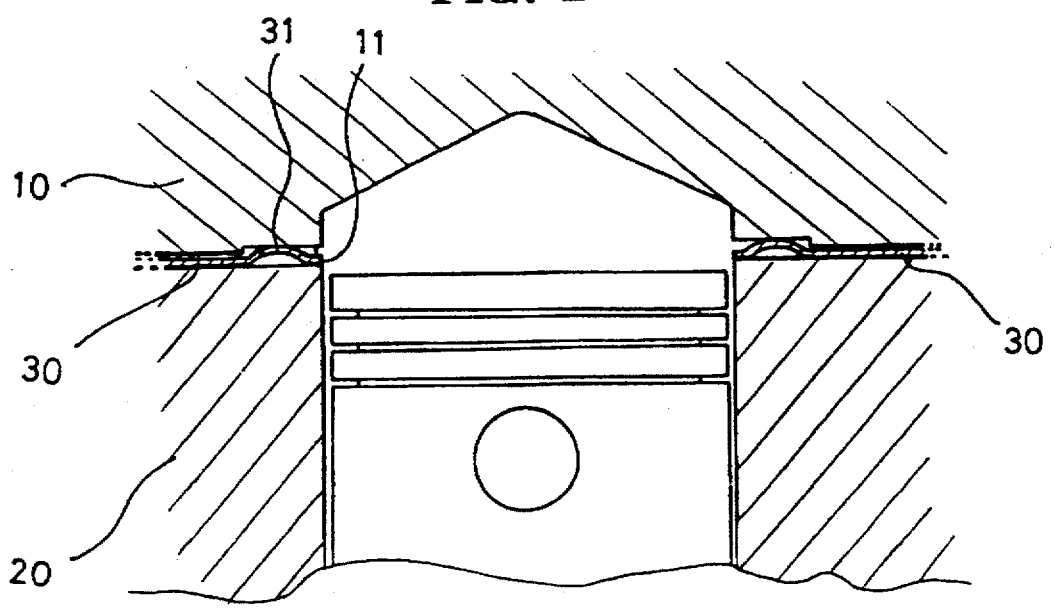
FIG. 2 is a sectional view showing a sealing structure for cylinder heads in accordance with a primary embodiment of the present invention.

FIG. 2 shows a sealing structure for cylinder heads in accordance with a primary embodiment of the present invention. As shown in the drawing, the sealing structure according to the primary embodiment comprises a gasket 30, which has a bead 31 and is placed in the junction between the cylinder head 10 and cylinder block 20 of an engine. In the above junction, the inside edge of the cylinder head 10 is cut off to form an annular bead placing step 11 used as the bead placing means. The bead 31 of the gasket 30 is placed in the above step 11. In this case, the ridge of the bead 31 is brought into linear contact with the plane surface inside the step 11.

Figure 3:
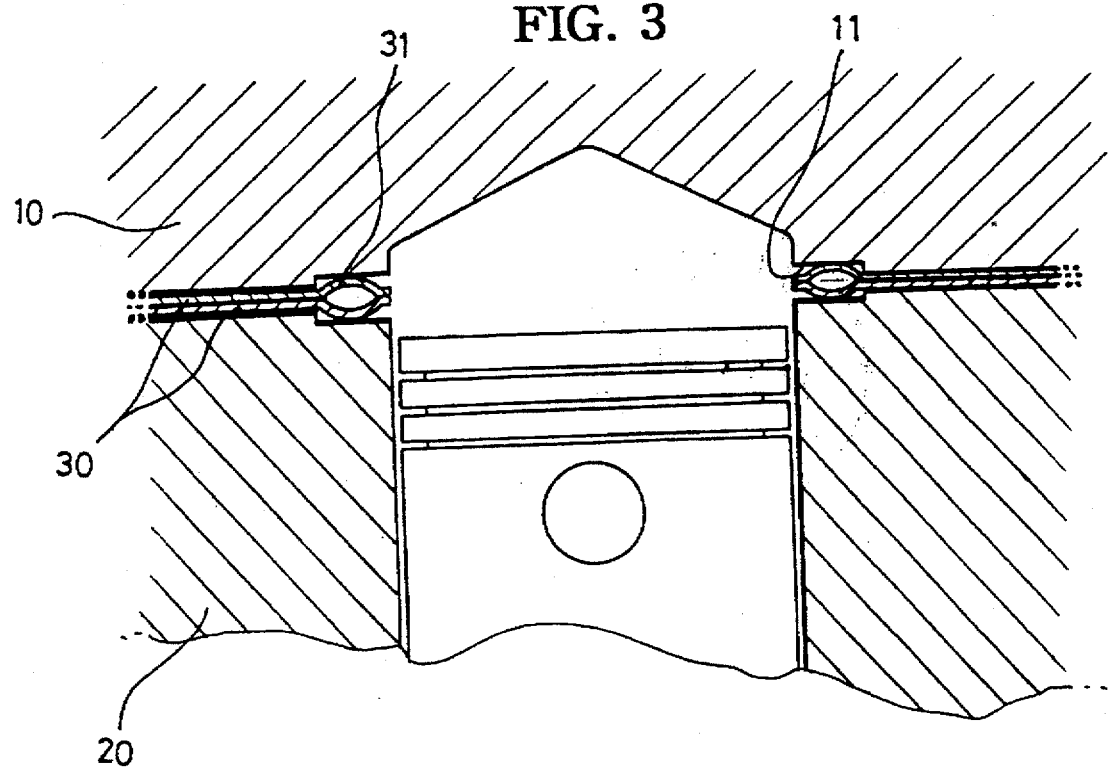
FIG. 3 is a sectional view showing a sealing structure for cylinder heads in accordance with another embodiment of the present invention.

FIG. 3 shows a sealing structure for cylinder heads in accordance with a second embodiment of the invention. In this embodiment, the sealing structure has two gaskets, that is, first and second gaskets 30 with respective beads 31. The second gasket 30 is closely overlapped under the first gasket 30 while being turned upside down thus forming a closed cavity by the beads 31 of the gaskets 30. In order to place the beads 31 of the above gaskets 30 in the junction between the head 10 and block 20, the inside edges of the head 10 and block 20 are cut off to form respective steps 11 used as the bead placing means. The beads 31 of the gaskets 30 are placed in the respective steps 11, so that the ridge of each bead 31 is brought into linear contact with the plane surface inside an associated step 11.

Figure 4:
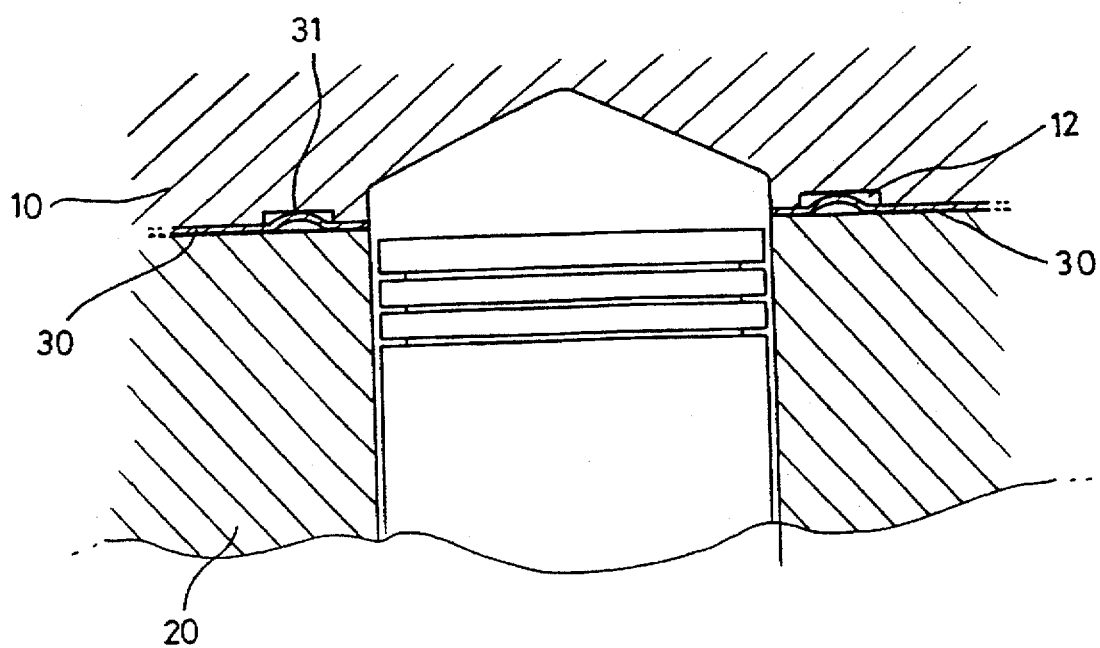
FIG. 4 is a sectional view showing a sealing structure for cylinder heads in accordance with a further embodiment of the present invention.

FIG. 4 is a sectional view showing a sealing structure for cylinder heads in accordance with a further embodiment of the present invention.

In the embodiment of FIG. 4, one gasket 30 is placed in the junction between the head 10 and block 20. The bead 31 of the above gasket 30 is not formed on the inside edge of the gasket 30, but is formed on a portion near the inside edge of the gasket 30 differently from the above embodiments. In this embodiment, the bead placing means comprises a plane depression 12, which is provided on the head 10 by depressing the bottom surface of the head 10 at a position near the inside edge of the head 10. The bead 31 of the gasket 30 is placed in the above depression 12, so that the ridge of the bead 31 is brought into linear contact with the plane surface of the depression 12.

In accordance with the present invention, the bead placing means is provided in the junction between the cylinder head 10 and block 20. The bead 31 of the gasket 30 is placed in the above bead placing means, so that the ridge of the bead 31 is not excessively compressed but is brought into linear contact with the bead placing means. The bead 31 of the gasket 30 thus maintains its elasticity for a lengthy period of time and thereby reliably seals the junction of highly-pressurized combustion gases.

As described above, the present invention provides a structurally-improved sealing structure for cylinder heads of internal combustion engines. In the sealing structure of this invention, one or two gaskets with beads are placed in the junction between the cylinder head and block. In addition, a bead placing means is provided in the junction between the head and block. The bead of the gasket is placed in the bead placing means, so that the ridge of the bead is not excessively compressed but is brought into linear contact with the bead placing means. The bead of the gasket thus maintains its elasticity for a lengthy period of time, thereby sealing the junction irrespective of highly-pressurized combustion gases and preventing leakage of coolant and engine oil through the junction. The above sealing structure also reduces the amount of mixed gas filling in the junction between the head and block, thus improving the mileage of a vehicle. The sealing structure almost completely restricts the exhaust of unburnt mixed gases during an exhaust stroke of an engine, thereby allowing the engine to be less likely to cause environmental pollution due to the exhaust of the unburnt mixed gases.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A sealing structure for sealing a cylinder head to a cylinder block, comprising:

a first gasket placed in a junction between said cylinder head and said cylinder block and being provided with an annular bead;

said junction being disposed radially outwardly from a combustion chamber and being defined by a groove formed in said cylinder head and a surface of said cylinder block, said groove opening into said combustion chamber;

said annular bead of said first gasket placed in said junction and is in linear contact with an upper surface of said groove.

2. The sealing structure according to claim 1, further comprising:

a second gasket placed in the junction and being provided with an annular bead; and wherein said junction is further defined by a groove formed in said cylinder block, said groove opening into said combustion chamber;

said annular bead of said second gasket placed in said junction and is in linear contact with a lower surface of said groove.

3. The sealing structure according to claim 1, wherein said first gasket has an arcuate portion disposed between linear portions, said arcuate portion forming said annular bead.

4. The sealing structure according to claim 1, wherein said annular bead does not contact a side wall of said groove.

* * * * *